(12) United States Patent
Hallaji

(10) Patent No.: US 9,028,734 B2
(45) Date of Patent: May 12, 2015

(54) PROCESS OF PRODUCING PCR PELLETS

(75) Inventor: Khosrow Hallaji, Elon, NC (US)

(73) Assignee: Consolidated Container Company LP, Atlanta, GA (US)

(*) Notice: Subject to any disclaimer, the term of this patent is extended or adjusted under 35 U.S.C. 154(b) by 462 days.

(21) Appl. No.: 13/520,073

(22) PCT Filed: Nov. 23, 2010

(86) PCT No.: PCT/US2010/057766
§ 371 (c)(1),
(2), (4) Date: Sep. 28, 2012

(87) PCT Pub. No.: WO2011/068717
PCT Pub. Date: Jun. 9, 2011

(65) Prior Publication Data
US 2013/0015604 A1    Jan. 17, 2013

Related U.S. Application Data

(60) Provisional application No. 61/266,240, filed on Dec. 3, 2009.

(51) Int. Cl.
*C08J 11/06* (2006.01)
*B29B 9/16* (2006.01)
*B29B 9/06* (2006.01)
*C08J 11/02* (2006.01)
*B29K 23/00* (2006.01)

(52) U.S. Cl.
CPC ... *B29B 9/16* (2013.01); *B29B 9/06* (2013.01); *B29K 2023/06* (2013.01); *B29K 2023/12* (2013.01); *C08J 11/02* (2013.01); *C08J 2323/04* (2013.01)

(58) Field of Classification Search
USPC ................................................. 264/344, 234
See application file for complete search history.

(56) References Cited

U.S. PATENT DOCUMENTS 5,767,230 A    6/1998   Scarola
2003/0015530 A1    1/2003   Shepler
2006/0160909 A1    7/2006   Richardson

OTHER PUBLICATIONS

Bernard, "Color-measuring instruments ensure recycle quality", in *Plastics Technology*, Gardner Publications, Jun. 1, 1994.
International Search Report dated Mar. 17, 2011 and issued in corresponding International Patent Application No. PCT/US2010/057766.
Office Action dated Mar. 23, 2012 issued in U.S. Appl. No. 12/958,758.
Applicant's Response to the Office Action dated Mar. 23, 2012 issued in U.S. Appl. No. 12/958,758.

*Primary Examiner* — Jacob Thomas Minskey
(74) *Attorney, Agent, or Firm* — Howson & Howson LLP

(57) ABSTRACT

A process for producing, from PCR polyolefin feedstock, pellets which are suitable for molding into useful articles suitable for food contact and other applications wherein feedstock fragrances are not desirable.

11 Claims, 2 Drawing Sheets

PROCESS OF PRODUCING PCR PELLETS

BACKGROUND OF THE INVENTION

Current FDA regulations essentially preclude the use of PCR polyolefin plastic materials for direct contact with food and beverages in containers unless stringent purity requirements are met. While there is a need to provide non-food and beverage containers made entirely of PCR polyolefin plastic materials, past attempts have met with only limited success and marketplace acceptance due to problems with container color, presence of unwanted fragrances, cross contamination, and complexity of the process.

Colored PCR polyolefin plastics are often imparted with strong fragrances due to residual volatiles that have been absorbed in the plastic from detergents, fabric softeners, shampoos, beauty care products, and other products they contained. Branded products companies have resisted putting their products in direct contact with PCR polyolefin plastics in the belief that it would change how such products were perceived by consumers if they were presented with an unfamiliar fragrance. Thus there is a current need for containers produced from 100% colored polyolefin PCR that have the conventional physical properties desired in plastic containers for fabric care, household, hair care, skin care, and other beauty care products, and are fragrance-free.

To provide desirable PCR polyolefin materials, the present invention provides certain improvements to the process disclosed in U.S. Pat. No. 5,767,230 issued Jun. 16, 1998 to Ecoplast Corporation, the assignee of the present application. In brief, the Ecoplast Patent discloses a process and apparatus for use in removing certain undesirable contaminations from post consumer recyclable (PCR) container fragments to form a desirable feedstock for further processing into PCR products, such as described, supra. The process patented involves the devolitization of flakes, or chips, of a predetermined size in heated stirred bed and fluidized bed vessels for a predetermined time period to produce flakes low or free of volatiles and fragrances to be used for food contact.

While the patented process functions satisfactorily for its intended purpose, it possesses certain limitations. For instance, the size of the flakes fed into the vessel must be controlled accurately. And, the vessel and stirrer geometries need to be closely related to the flake size to ensure proper flow of heated gas and flow of flakes through the vessel to ensure complete de-volatization. Typically, the de-volatized flakes are then transferred to storage silos to await delivery to users who employ PCR polyolefin products for certain applications, such as extrusion and blow molding, which have a big risk of cross contamination and high material handling cost.

An important object of the present invention is to provide a process which tolerates greater latitude in the source material of the raw flakes, in their processing parameters, and in the de-volatization vessel geometries, to thereby provide PCR polyolefin materials that have desirable properties for subsequent use in food containers, household, and personal care product applications.

DESCRIPTION OF A PREFERRED DEVOLITIZATION PROCESS

Limonene is an aromatic compound that can be found in food, cosmetics, and detergent and cleaning containers. It is known to be difficult to remove limonene from PCR polyolefin plastics. As one of the last volatiles to be removed, it serves as a good surrogate for the effectiveness of any volatile removal process. As used herein, "fragrance-free or "suitable for food contact" means having less than 320 ppb of limonene, which is also the prescribed threshold for approved food contact applications per the US FDA (Use of Recycled Plastics in Food Packaging, August 2006, US Food and Drug Administration). As used herein, "odiferous", when used in association with a plastic material, means having an odor other than the odor of the plastic material in its virgin resin state.

In the process disclosed in U.S. Pat. No. 5,767,230 discussed, supra, PCR Polyolefin flakes are de-volatized and stored in silos for subsequent extrusion into usable pellets. In the preferred process disclosed herein, the PCR polyolefin flakes are first extruded into pellets, and the pellets are then de-volatized. This direct-coupled sequence provides better de-volatization, minimizes potential cross contaminations, and better storage and handling advantages than realized with the aforementioned patented process.

Figure 1:
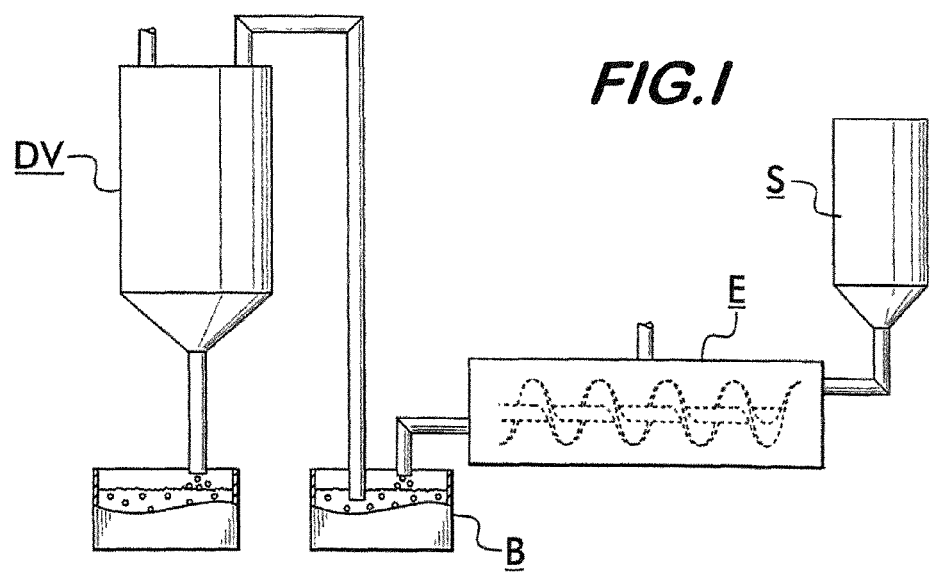
FIG. 1 is a schematic diagram of a preferred process for producing PCR polyolefin pellet useful for food contact, household, and personal care containers.

The preferred process is illustrated schematically in FIG. 1. In brief, raw odiferous commercially extreme washed PCR polyolefin flakes, i.e., flakes which carry odors imparted by the containers from which the flakes were chopped, are stored as flakes in a silo S. The flake silo is directly coupled to an extruder E which forms the flakes into PCR polyolefin pellets of conventional size, but still carrying odors making them not suitable to be used in direct contact with food products. The PCR polyolefin pellets are then directly fed into the de-volatization vessel DV in which the pellets are subjected to hot gas and agitation for a predetermined period of time, after which they are discharged from the vessel for subsequent extrusion and blow molding in a conventional manner into containers.

According to the present invention, it is important for the flakes to be extruded into pellets before being de-volatized. Desirably, the pellets are flat, circular discs, having a diameter on the order of about 0.0625 inch (1.5875 mm) and a thickness on the order of 1-2 mm. The pellets have a density in a range of about 0.855 to about 0.965 g./cc (A.S.T.M. (D.-792)). The pellets can then either be stored for subsequent use, sold, or preferably, directly fed into the devolitization chamber for subsequent sale for use in molding new containers of PCR polyolefin materials as described, supra.

In preparing the pellets for de-volatization, the flakes are transported first from the silo S to the extruder E. The extruder E is of conventional construction, having a hopper at one end and a die at the opposite end of a horizontally elongate barrel with a screw and heaters. The barrel has a controllable vent at about its midpoint to enable moisture and volatiles to be off-gassed from the particles passing lengthwise through the barrel. The temperature in the extruder is typically maintained in a range of about 160° C. to about 270° C., depending on the PCR polyolefin flakes. For PCR polyolefin flakes, a preferred temperature range is between about 180° C. to about 240° C. measured immediately upstream of the die. The extruded pellets are flowed into a cooling bath B of water that transports them to the next station in the process.

Figure 2:
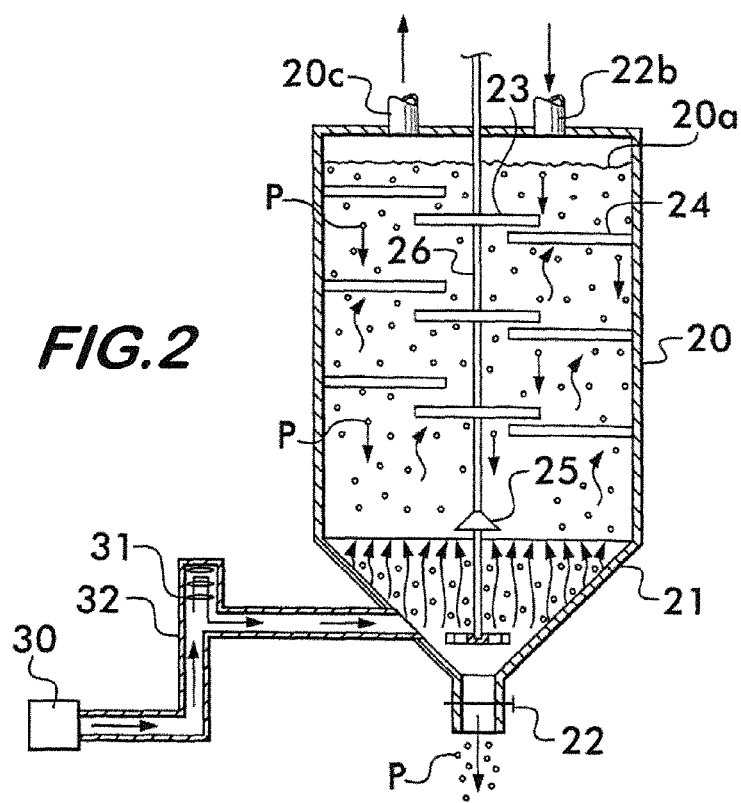
FIG. 2 is a schematic vertical sectional view illustrating a preferred de-volatization vessel useful in practicing the process of the invention.

As illustrated schematically in FIG. 2, a preferred de-volatization vessel DV comprises an upright cylindrical wall 20 having a frusto-conical bottom wall 21 with a valved discharge. Pellets P are charged into the upper end 20a of the vessel 20 through an inlet 22b, and are discharged from the bottom after having been contacted with hot air. The hot air is filtered and admitted into the bottom of the chamber and flowed upwardly in the vessel to exhaust from an outlet 20c at the top of the vessel. The pellets P move downwardly by gravity at a slow rate while the hot air, at a temperature in a range of about 50° C. to about 125° C., and more preferably between about 90° C. to about 125° C., flows upwardly at a vertical linear velocity about 1.0 ft/sec. (0.3048 m/sec.) to about 2.1 ft/sec. (0.6400 m/sec.).

While migrating downwardly, the pellets P are in a loosely confined mass that is continuously stirred by a series of paddles 23 that are disposed between radially inwardly extending shelves 24 in the chamber. The pellet output rate is adjusted to ensure a residence time of the pellets P of between about 1 to about 15 hours, and more preferably between about 3 to about 10 hours. The steady state temperature of the hot air measured between the bottom hot air inlet manifold and the top of the vessel is maintained in a range of about 104° C. to about 116° C. Preferably, the air is flowed by a blower 30, and is measured and maintained through a heater 31 connected to a manifold located inside the bottom wall 21. As the pellets P descend downwardly toward the bottom of the devolitizer, they are flowed radially outward by a frusto-conical baffle 25 mounted adjacent the lower end of the cylindrical portion of the de-volatizer chamber. Preferably, the baffle 25 is connected to a central vertical shaft 26 which mounts the agitator paddles 23. The baffle 25 rotates in unison with the paddles. The baffle 25 diverts the general flow of pellets radially outwardly toward the upper end of the frusto-conical bottom wall, and this functions to control downward flow of pellets centrally of the de-volatizer by inhibiting undesirable flow during periods of discharge from the bottom through the bottom air lock valve 22 which discharges pellets cyclically in slugs.

The conical baffle 25 has a peripheral diameter that is in a range of about ⅙ to about ⅑ of the inside diameter of the de-volatizer chamber where its cylindrical wall merges with its frusta-conical bottom wall. The baffle 25 has an angle of inclination, measured at its periphery, in a range of between about 30° to about 70° relative to horizontal.

A random sample of pellets, cooled to room temperature after de-volatization, was analyzed in a lab for the presence of limonene. Each point on the chart represents a sample measurement taken each day over a twelve (12) day time period at the stated times of day. The results are set forth in graphic fashion below.

Figure 3:
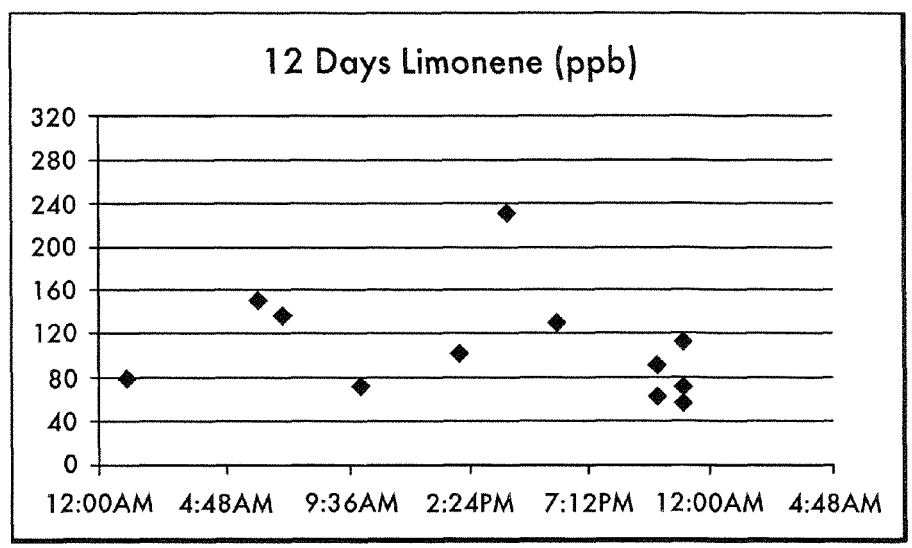
FIG. 3 illustrates the effects of devolitization treatment with time in the preferred process.

FIG. 3 illustrates the limonene content of the pellets measured at start-up after hot air was initially admitted into the bottom of the devolitization chamber. After five (5) hours of treatment, the limonene level dropped well below the 320 ppb level which the FDA recognizes as an acceptable level for polyolefin use in food and beverage containers.

The process of the present invention is capable of providing not only FDA acceptable pellets for food and beverage container applications, but also providing fragrance free pellets for household product containers.

The process of the invention is more efficient than the patented process of the prior art patent referenced, supra. This is because the process of the present invention enables about a thirty percent (30%) increase in throughput per hour of de-volatizer pellets, and this results in a concomitant reduction in thermal, and other, energy required to produce commercially-desirable PCR polyolefin pellets for food contact. Moreover, the direct coupling provided by the process eliminates the heretofore time-consuming, and costly clean-ups associated with potential cross-contamination of feed stocks in the extruder used in the prior art process, and reduces material handling and other operational costs.

The invention claimed is:

1. A process for producing fragrance-free pellets having a limonene content of less than about 320 parts per billion from post-consumer recyclable (PCR) polyolefin plastic comprising the steps, performed in the following sequence, of
    (i) extruding odiferous PCR polyolefin chips to form odiferous pellets;
    (ii) contacting the odiferous pellets with hot air at a temperature of about 50° C. to about 125° C. for about 3 to about 10 hours in a vessel to form fragrance-free pellets;
    (iii) flowing the fragrance-free pellets vertically downward to a common outlet; and
    (iv) discharging the fragrance-free pellets in discrete slugs from the vessel in sequential controlled quantities.

2. The process of claim 1 wherein said odiferous chips are directly subjected to said de-volatizing step without any intervening storage.

3. The process according to claim 1 where the pellets are flowed downwardly through said vessel by gravity and are contacted by hot air flowed upwardly in said vessel at a superficial velocity in a range of about 1.00 ft/sec to about 2.10 ft/sec and at a temperature in a range of about 90° C. to about 125° C.

4. The process according to claim 1 where the pellets are stirred continually in a rotary manner as they descend in the vessel.

5. The process according to claim 1 wherein the pellets are discharged from the vessel in sequential controlled quantities to control the required duration of residence in the vessel.

6. The process according to claim 1 including the step of directing the flow of pellets in a lateral direction between said stirring step and said sequential discharging step.

7. In a process for de-volatizing PCR polyolefin plastic pellets in a vessel having tapered bottom wall (21) with a central outlet (22), wherein the pellets are permitted to flow downwardly by gravity in a loose mass while being stirred, and are contacted by hot gas flowing upwarding through the mass of the pellets, the improvement comprising the step of controlling the downward movement of the mass of pellets above the outlet (22) while discharging the pellets in discrete slugs of de-volatized pellets.

8. The process according to claim 7 wherein said controlling step includes the step of displacing pellets laterally by a baffle (25) located above the outlet (22).

9. The process according to claim 8 wherein said mass of pellets is disposed in a cylindrical formation as it descends downwardly, and said displacing step is performed centrally of the mass above the outlet (22).

10. The process according to claim 9 wherein the baffle (25) has an angle of inclination in a range of between about 30 degrees to about 70 degrees.

11. The process according to claim 9 where the baffle (25) has an outer diameter which is about ⅙ to about ⅑ of the inner diameter of the vessel.

\* \* \* \* \*